(12) United States Patent
Brand et al.

(10) Patent No.: US 11,394,704 B2
(45) Date of Patent: Jul. 19, 2022

(54) INTEGRATED SECOND FACTOR AUTHENTICATION

(71) Applicant: Google LLC, Mountain View, CA (US)

(72) Inventors: Erica Wickstrom Brand, Palo Alto, CA (US); Marius Paul Michiel Schilder, Sunnyvale, CA (US); Scott D. Johnson, Cupertino, CA (US); Vincent Palatin, Zurich (CH)

(73) Assignee: Google LLC, Mountain View, CA (US)

( * ) Notice: Subject to any disclaimer, the term of this patent is extended or adjusted under 35 U.S.C. 154(b) by 196 days.

(21) Appl. No.: 16/412,686

(22) Filed: May 15, 2019

(65) Prior Publication Data

US 2019/0306161 A1 Oct. 3, 2019

Related U.S. Application Data

(63) Continuation of application No. 15/438,570, filed on Feb. 21, 2017, now abandoned.

(51) Int. Cl.
*G06F 7/04* (2006.01)
*H04L 9/40* (2022.01)
(Continued)

(52) U.S. Cl.
CPC .......... *H04L 63/0853* (2013.01); *H04L 63/06* (2013.01); *H04L 63/083* (2013.01);
(Continued)

(58) Field of Classification Search
CPC .......... G06F 21/31; G06F 21/34; G06F 21/44; G06F 21/70–72; G06F 21/82–88;
(Continued)

(56) References Cited

U.S. PATENT DOCUMENTS 9,648,015 B1 5/2017 Avetisov et al.
9,848,036 B1 * 12/2017 Smus ................. H04L 67/10
(Continued)

FOREIGN PATENT DOCUMENTS

CA 2187855 10/1996
CN 1913429 2/2007
(Continued)

OTHER PUBLICATIONS

Huang et al, IC Activation and User Authentication for Security-Sensitive Systems, Jun. 9, 2008, IEEE, pp. 1-5. (Year: 2008).*
(Continued)

*Primary Examiner* — Luu T Pham
*Assistant Examiner* — Jenise E Jackson
(74) *Attorney, Agent, or Firm* — Fish & Richardson P.C.

(57) ABSTRACT

Techniques and apparatuses are described that enable integrated second factor authentication. These techniques and apparatuses enable the improved security of something you have without the accompanying inconvenience or chance of loss. To do so, a secure physical entity is integrated within a computing device. While this provides the something you have without a need to carry a separate object with you, the something you have also must not be able to be accessed remotely. To prevent remote access physical wires are connected from the secure physical entity to physical structures on the computing device. In this way, a hacker or cyber thief cannot convince an authentication system that the cyber attacker does indeed have the something you have because to do so the attacker must be in physical possession of the computing device.

14 Claims, 6 Drawing Sheets

(51) Int. Cl.
*H04W 4/80* (2018.01)
*H04W 12/041* (2021.01)
*H04W 12/069* (2021.01)
*G06F 21/34* (2013.01)
*H04W 12/68* (2021.01)

(52) U.S. Cl.
CPC .......... *H04W 4/80* (2018.02); *H04W 12/041* (2021.01); *H04W 12/069* (2021.01); *G06F 21/34* (2013.01); *G06F 2221/2113* (2013.01); *G06F 2221/2153* (2013.01); *H04L 63/105* (2013.01); *H04L 2463/082* (2013.01); *H04W 12/68* (2021.01)

(58) Field of Classification Search
CPC ..... G06F 2221/2113; G06F 2221/2153; G06F 21/36; G06F 21/76; H04L 63/0853; H04L 63/06; H04L 63/083; H04L 63/105; H04L 2463/082; H04L 63/10; H04W 12/069; H04W 12/041; H04W 12/68
See application file for complete search history.

(56) References Cited

U.S. PATENT DOCUMENTS

| | | | | |
|---|---|---|---|---|
| 10,380,331 | B2* | 8/2019 | Burch | G06F 21/31 |
| 2003/0097585 | A1 | 5/2003 | Girard | |
| 2004/0123113 | A1 | 6/2004 | Mathiassen et al. | |
| 2004/0139351 | A1 | 7/2004 | Tsang | |
| 2007/0067642 | A1 | 3/2007 | Singhal | |
| 2009/0222909 | A1 | 9/2009 | Challener et al. | |
| 2009/0328169 | A1 | 12/2009 | Hutchinson et al. | |
| 2010/0321159 | A1 | 12/2010 | Stewart | |
| 2011/0070864 | A1* | 3/2011 | Karam | G06F 21/34 |
| | | | | 455/411 |
| 2011/0302630 | A1 | 12/2011 | Nair et al. | |
| 2012/0324242 | A1 | 12/2012 | Kirsch | |
| 2013/0283199 | A1* | 10/2013 | Selig | G06F 21/74 |
| | | | | 715/781 |
| 2014/0078037 | A1* | 3/2014 | Herrod | H04L 12/2825 |
| | | | | 345/156 |
| 2014/0123253 | A1* | 5/2014 | Davis | G06F 21/316 |
| | | | | 726/6 |
| 2014/0125574 | A1* | 5/2014 | Scavezze | H04W 12/06 |
| | | | | 345/156 |
| 2014/0289833 | A1 | 9/2014 | Briceno et al. | |
| 2015/0100795 | A1 | 4/2015 | Fogelson | |
| 2015/0199504 | A1* | 7/2015 | Feng | G06F 3/04883 |
| | | | | 726/28 |
| 2015/0242605 | A1* | 8/2015 | Du | G06F 21/32 |
| | | | | 726/7 |
| 2016/0062542 | A1* | 3/2016 | Kim | G06F 3/0447 |
| | | | | 345/174 |
| 2016/0077650 | A1* | 3/2016 | Durojaiye | G06F 3/0418 |
| | | | | 345/173 |
| 2016/0253651 | A1 | 9/2016 | Park | |
| 2016/0344710 | A1 | 11/2016 | Khan | |
| 2017/0017783 | A1* | 1/2017 | Willis | G06K 9/00013 |
| 2017/0085688 | A1* | 3/2017 | Zhou | H04B 1/385 |
| 2017/0094510 | A1* | 3/2017 | Khosravi | G06F 21/72 |

FOREIGN PATENT DOCUMENTS

| | | |
|---|---|---|
| CN | 101933051 | 12/2010 |
| CN | 101937496 | 8/2014 |
| TW | 200919255 | 5/2009 |
| WO | WO2000042489 | 7/2000 |
| WO | WO2016018390 | 2/2016 |
| WO | WO2018156210 | 8/2018 |

OTHER PUBLICATIONS

Kothmayr et al, DTLS based Security and Two-Way Authentication for the Internet of Things, May 17, 2013, Elsevier, pp. 2710-2723. (Year: 2013).*
GB Office Action in United Kingdom in Appln. No. 1717606.6, dated Jun. 5, 2019, 1 pages.
PCT International Preliminary Report on Patentability in International Appln. No. PCT/US2017/057656, dated May 22, 2019, 9 pages.
Marforio et al, "Hardened setup of personalized security indicators to counter phishing attacks in mobile banking," ACM, Oct. 24, 2016, 10 pages.
GB Search and Examination Report in United Kingdom Appln. No. 1914300.7, dated Dec. 11, 2019, 4 pages.
GB Office Action in Great Britain Application No. GB1914300.7, dated May 6, 2020, 2 pages.
CN Office Action in Chinese Appln. No. 201711039523, dated Apr. 30, 2021, 31 pages (with English translation).
Office Action in Chinese Appln. No. 201711039523.7, dated Jan. 10, 2022, 6 pages (with English translation).
Foreign Office Action, Chinese Application No. 201721418212.7, dated Apr. 28, 2018, 6 pages.
Foreign Office Action, United Kingdom Application No. 1717606.6, dated May 2, 2018, 10 pages.
Search Report, Taiwanese Application No. 106130232, dated Jun. 26, 2018, 1 page.
Written Opinion of the International Preliminary Examing Authority, PCT Application No. PCT/US2017/057656, dated Jan. 23, 2019, 7 pages.

* cited by examiner

INTEGRATED SECOND FACTOR AUTHENTICATION

CROSS-REFERENCE TO RELATED APPLICATIONS

This application is a continuation of U.S. application Ser. No. 15/438,570, filed Feb. 21, 2017, the contents of which are incorporated by reference herein.

BACKGROUND

In the modern world of internet hackers and cyber thieves, passwords alone may not be adequate to protect valuable information. Whether that information is desired to steal a person's identity or for blackmail, to sabotage a company or government, or simply to cause havoc, authentication systems are constantly attacked by these malicious actors. Most of these hackers and thieves, however, attack authentication systems remotely; they are not actually at a person's computer. Instead, they are far away, often in a different part of the world. Because of this, authentication systems can require both something you know, such as a password that hackers and thieves can steal or guess, with something you have, such as a physical key, bank card, or security chip. So long as the something you have isn't stolen, the authentication system is much more durable against cyberattacks.

Through use of something you have, a person's presence is confirmed, which is very nearly the most important element to good cybersecurity. The news is full of stories about millions of people's account numbers, passwords, and even social security numbers being stolen. But rarely is a meaningful number of physical cards, keys, or security chips stolen.

While requiring two factors—a first factor of something you know with a second factor of something you have—improves cybersecurity, it does have drawbacks. One drawback is that people lose those haves. They lose their bank card, badge, key, or fob with a security chip, as these are often small in order to be convenient. When the have is lost, the person cannot access the information. And even when it is not lost, it is one more thing a person needs to keep track of, which can be inconvenient and irritating.

This background description is provided for the purpose of generally presenting the context of the disclosure. Unless otherwise indicated herein, material described in this section is neither expressly nor impliedly admitted to be prior art to the present disclosure or the appended claims.

SUMMARY

Techniques and apparatuses are described that enable integrated second factor authentication. These techniques and apparatuses enable the improved security of something you have without the accompanying inconvenience or chance of loss. To do so, a secure physical entity is integrated within a computing device. While this provides the something you have without a need to carry a separate object with you, the something you have also must not be able to be accessed remotely. To prevent remote access physical wires are connected from the secure physical entity to physical structures on the computing device. In this way, a hacker or cyber thief cannot convince an authentication system that the cyber attacker does indeed have the something you have because to do so the attacker must be in physical possession of the computing device.

Aspects described below include a computing device comprising a secure physical entity integrated with the computing device, physical structures communicatively connected to the secure physical entity through wires, one or more processors, and one or more computer-readable storage media. The one or more computer-readable storage media have instructions thereon that, responsive to execution by the one or more processors, perform operations comprising receiving, through the wires, a combination of physical selections made through the physical structures, determining, based on the combination of physical selections, that a person is in possession of the secure physical entity, and indicating that the person is in possession of the secure physical entity.

Aspects described below also include a method comprising receiving, through a wired or near-field communication (NFC) wireless transmission, a combination of physical selections, the combination of physical selections made through two or more physical structures, the two or more physical structures integrated with a computing device or a peripheral of the computing device, determining, based on the combination of physical selections, that a person is in possession of a secure physical entity, the secure physical entity integral with the computing device, and responsive to determining possession of the secure physical entity, enabling use of a resource of the computing device.

Aspects described below also include a receiving through wires a combination of physical selections, the combination of physical selections made through three or more physical structures, the three or more physical structures integrated with a computing device, determining, based on the combination of physical selections, that a person is in possession of a secure physical entity, the secure physical entity integral with the computing device, authenticating the person based on the combination of physical selections, and responsive to determining possession of the secure physical entity and authenticating the person, enabling use of a resource of the computing device.

Aspects described below also include a system comprising means for receiving a combination of physical selections, means for determining, based on the combination of physical selections, that a person is in possession of a secure physical entity, the secure physical entity integral with the system, and means for enabling use of a resource of the computing device responsive to determining possession of the secure physical entity.

BRIEF DESCRIPTION OF THE DRAWINGS

Apparatuses of and techniques enabling integrated second factor authentication are described with reference to the following drawings. The same numbers are used throughout the drawings to reference like features and components.

DETAILED DESCRIPTION

Overview

Authentication systems, by requiring both something you know and something you have, substantially improve information and resource security. This is because many cyber-attacks are performed remotely, and thus a something you have often protects against these remote attacks. While successful to improve cybersecurity, requiring a something you have with a something you know requires people to keep track of those haves. If a person loses the have she cannot be authenticated. And even if it isn't lost, requiring people to keep track of a something you have is inconvenient or irritating.

To address this flaw, techniques and apparatuses are described below that enable integrated second factor authentication. These techniques and apparatuses enable the improved security of something you have without the accompanying inconvenience or chance of loss. To do so, a secure physical entity is integrated within a computing device. While this provides the something you have without a need to carry a separate object with you, the something you have also must not be able to be accessed remotely. To prevent remote access physical wires are connected from the secure physical entity to physical structures on the computing device. In this way, a hacker or cyber thief cannot convince an authentication system that the cyber attacker does indeed have the something you have because to do so the attacker must be in physical possession of the computing device. With a physical, non-counterfeitable selection of the physical structures on the computing device, the person proves to the authentication system that the person is in possession of the secure physical entity.

Consider, for example, a case where a person must maintain a key fob having a security chip. If the person leaves it at home, he cannot access his computer at work. If he gets it wet or dirty, it may not work. If he breaks it, or loses it, again he cannot access his computer. In contrast, through the described integrated second factor authentication, a person can always access his or her computer because the something you have is integrated with the computer—he can press some selection of buttons or keys that, through physical wires, communications with a physical secure entity to prove he has possession of his computer.

The following discussion first describes an operating environment, then methods, physical selections for a secure physical entity, and ends with an example electronic device and example aspects.

Example Environment

Figure 1:
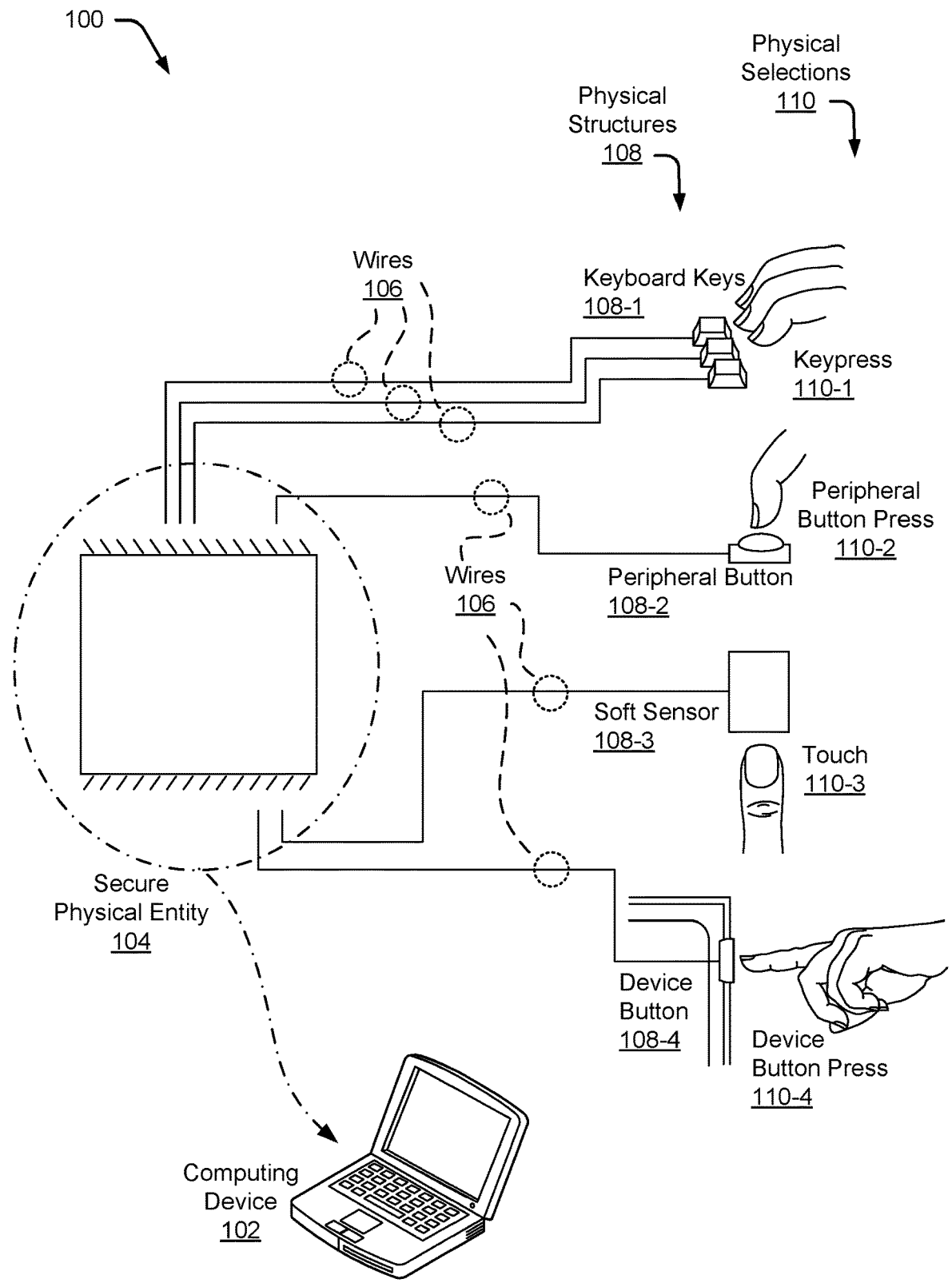
FIG. 1 illustrates an example environment in which integrated second factor authentication can be embodied.

FIG. 1 illustrates an example environment 100 in which integrated second factor authentication can be embodied. Example environment 100 includes a computing device 102 having a secure physical entity 104, wires 106, physical structures 108, and physical selections 110. The computing device 102 includes the secure physical entity 104, such as through integration with its circuitry. The secure physical entity 104 can determine that a person is in possession of the secure physical entity 104 through a combination of the physical selections 110 of the physical structures 108. The physical structures 108 can be integrated with, or peripheral to, the computing device 102, and are communicatively connected, here through the wires 106, to the secure physical entity 104. Based on the combination of the physical selections 110 matching a combination of selections associated with the person, the secure physical entity 104 determines that the person is in possession of the computing device 102 and the secure physical entity 104. In this way, the techniques authenticate with a second factor—the second factor of a something you have, rather than only a first factor, generally a something you know.

By way of example, assume that a person wishes to use her laptop computer. To do so, she needs two-factor authentication, here the something you know of a password entered into a user interface of the computer, and a something you have evidenced through selection of a combination of physical selections to prove possession of the secure physical entity 104. Assume that she turns the laptop on, and then enters her password in a home screen. Then, for a second factor, presses the shift key on her integrated keyboard, and simultaneously, the number "9" on the keyboard, and the volume-up button on the laptop's display. With a password authenticated and proof of possession determined, the laptop permits access. Note that it would be difficult if not impossible for a remote hacker or cyber thief to gain access without also having possession of the laptop and prove this possession through selection of this combination of keys and button.

In more detail, examples of the physical selections 110 include a keypress 110-1, peripheral button press 110-2, touch 110-3 of a soft sensor, or device button press 110-4. For the keypress 110-1, assume that the computing device 102 is either integrated with a keyboard or has a wired connection to the keyboard. This keyboard includes keys 108-1, whether typical mechanical keys or soft-touch, or buttons that require a physical selection. The peripheral button press 110-2 is a physical, generally mechanical press of a peripheral button 108-2 of a device having a wired connected to the computing device 102, such as a power button on a display or a volume button or wheel of a peripheral audio speaker. The touch 110-3 of a soft sensor 108-3 can include placing a finger or stylus next to a capacitive or hall-effect sensor, a touch of a touchpad, or a touch of a touch screen or fingerprint reader. The device button press 110-4 presses, holds, or moves a button or switch, here a device button 108-4.

Figure 2:
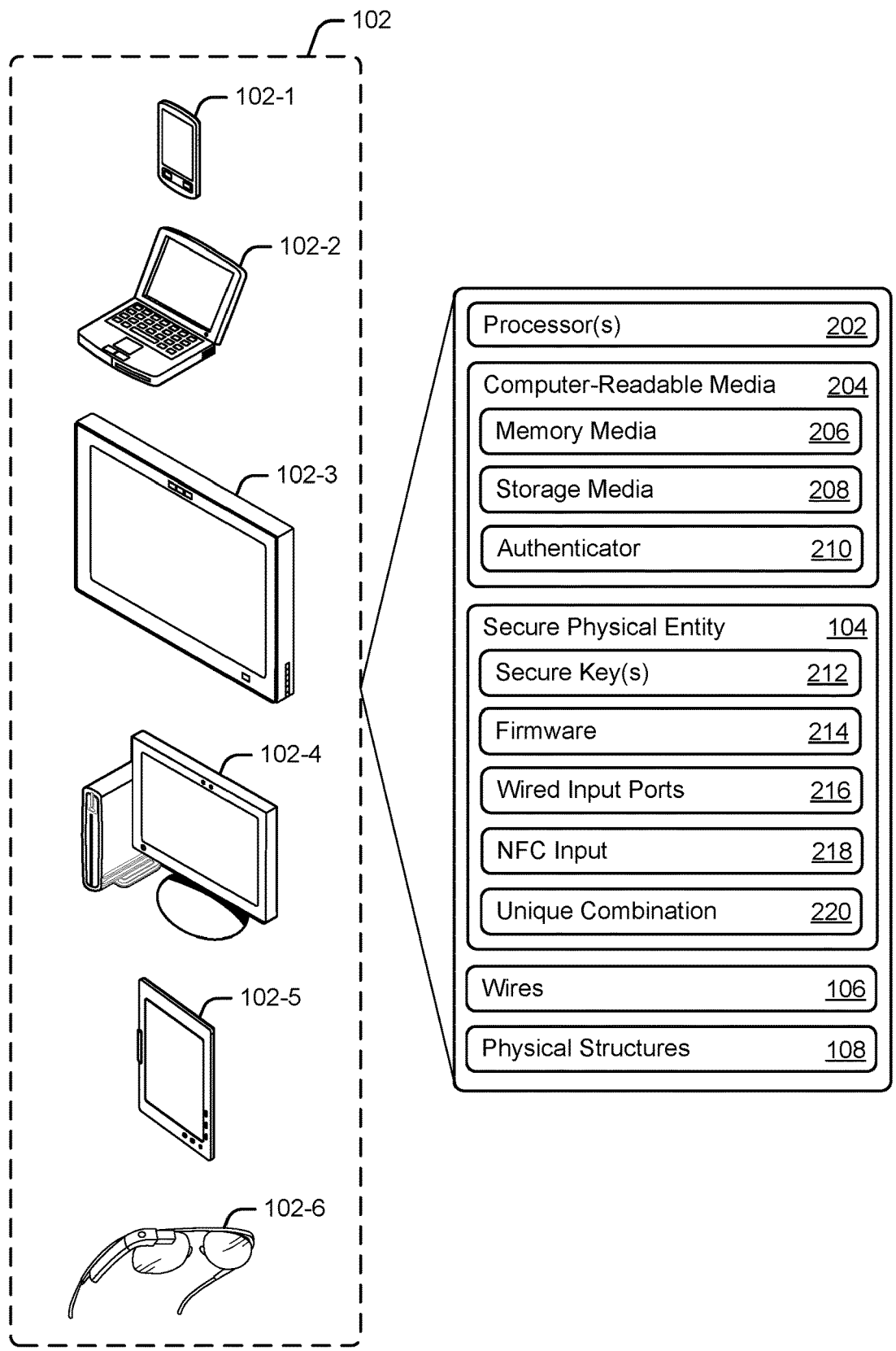
FIG. 2 illustrates elements of FIG. 1 in greater detail.

Consider FIG. 2, which illustrates elements of FIG. 1 in greater detail. The computing device 102 is illustrated with various non-limiting example devices: smartphone 102-1, laptop 102-2, television 102-3, desktop 102-4, tablet 102-5, and wearable computer 102-6. The computing device 102 includes computer processor(s) 202 and computer-readable media 204, which includes memory media 206 and storage media 208. Applications and/or an operating system (not shown) embodied as computer-readable instructions on computer-readable media 204 can be executed by processor(s) 202 to provide some of the functionalities described herein. The computer-readable media 204 also includes authenticator 210, which can be stored separately or as part of the storage media 208. The authenticator 210 is configured to authenticate a person through two-factor authentication, either alone or in combination with other programs. The authenticator 210 operates to assist or use the secure physical entity 104, depending on the implementation. The computing device 102 also includes the secure physical entity 104 and either includes or is in communicative connection with the physical structures 108, often through wires 106.

In more detail, the secure physical entity 104 can be integrated with the processors 202 and the computer-readable storage media 208, though it may also include its own processors and/or storage media. For example, the secure physical entity 104 may include memory having a cryptographically secure key 212, firmware 214, and wired input ports 216. The cryptographically secure key 212 is something that can be assured to be secure, such as a one-way key generated through a hash algorithm, though many different types of secure keys could be used. The firmware 214 is configured to perform the operations of the methods described below, alone or in conjunction with other entities (e.g., the authenticator 210), though in some aspects the secure physical entity 104 can be entirely hardwired, relying on other applications to perform some operations. The wired input ports 216 are not generally capable of being communicated with from any appreciable distance other than through the wires 106.

In some cases, the secure physical entity 104 also includes an NFC (near-field communication) input 218. Thus, wireless physical selections may be communicated to the secure physical entity 104 in conjunction with a wired communication from another physical structure. In such a case, one of the physical selections can be made through a physical structure integral with a peripheral to the computing device 102 (with that selection received through a near field transmission (NFC)) and another with a physical selection made to a structure in wired communication with the secure physical entity 104. Further examples include a case where an NFC communication is known to be both local and secure permitting the techniques to determine that a person is in possession of the secure physical entity 104 even without a wired communication. NFC examples include a wireless keyboard having physical structures that are selectable, either alone in combination with a wired selection, such as a tablet power button and a tablet wireless keyboard.

The secure physical entity 104 also includes a unique combination 220, which represents the combination of the physical selections 110 needed to determine that the person is in possession. On determination of the possession, the secure physical entity 104 can provide the secure key 212, as noted in more detail elsewhere herein.

The physical structures 108, which are illustrated in part in FIG. 1, can also include mechanical or non-mechanical structures requiring movement or proximity, respectively. Examples include mechanical structures requiring movement to indicate a selection, e.g., a button, lever, keypad, keys, volume, power, or other mechanical movement integrated within a chassis of the computing device 102 or some peripheral. Other examples include non-mechanical structures requiring proximity of a stylus or finger of the person to indicate a selection, such as a hall effect, soft/capacitor, motion or proximity sensor.

The secure physical entity 104 is configured to receive, through the wires 106, a combination of physical selections 110 made through the physical structures 108. Then, based on the combination of physical selections, the secure physical entity 104 determines that a person is in possession of the secure physical entity 104. The secure physical entity 104 can indicate that the person is in possession of the secure physical entity 104, such as to a remote authentication system or locally to the authenticator 210, which in turn allows access to a resource by the person. The secure physical entity 104 may, however, simply cause the information or resource to be accessed by the person through operation of the firmware 214.

In some aspects, the secure physical entity 104 is a silicon chip integral with an integrated circuit, motherboard, or other hardware of the computing device 102. For example, the secure physical entity 104 can be wired, e.g., as part of a printed circuit board (PCB), with the wires 106 being signal traces on the PCB going to the physical structures 108. The secure physical entity 104 can include a previously and permanently set unique combination of physical selections associated with one or even multiple people. Ways in which these combinations are initialized are described elsewhere herein.

Having generally described the environment in which techniques and apparatuses for integrated second factor authentication can be implemented, this discussion now turns to example methods.

Example Methods

Figure 3:
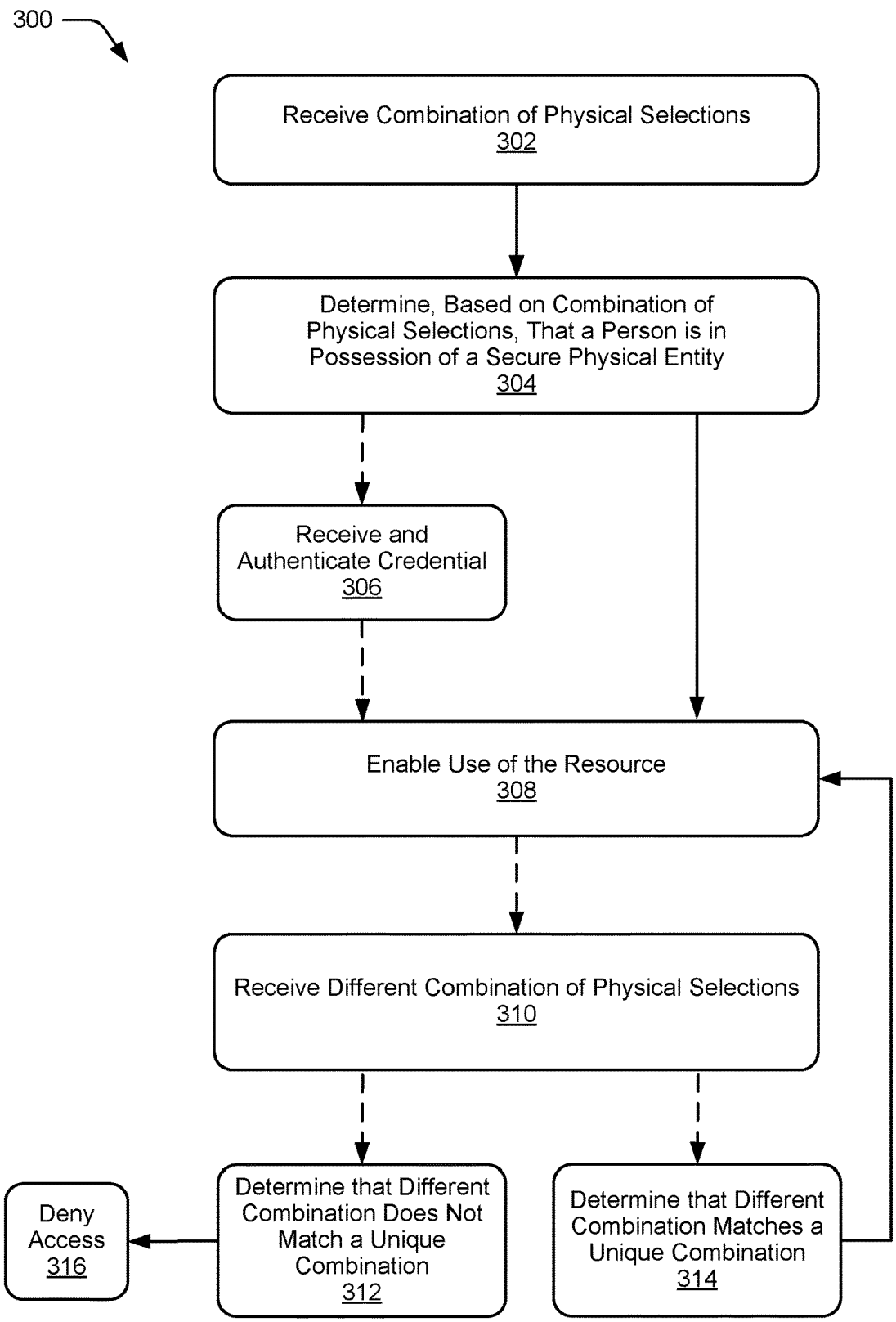
FIG. 3 illustrates example methods for authenticating a second factor, namely possession of a secure physical entity.

The following discussion describes methods for integrated second factor authentication. These methods can be implemented utilizing the previously described examples, such as the computing device 102 and the secure physical entity 104 as shown in FIGS. 1 and 2. Aspects of these methods are illustrated in FIG. 3, which are shown as operations performed by one or more entities. The orders in which operations of these methods are shown and/or described are not intended to be construed as a limitation, and any number or combination of the described method operations can be combined in any order to implement a method, or an alternate method.

FIG. 3 illustrates example method 300 for authenticating a second factor, namely possession of a secure physical entity.

At 302, a combination of physical selections is received through a wired or near-field wireless transmission. The combination of physical selections is made through two or more physical structures that are integrated with a computing device or a peripheral of the computing device. This combination of physical selections can be simultaneous, such as pressing two buttons at once, or in series, such as pressing a volume-up button, releasing the volume-up button, and then quickly pressing an escape key, for example. Some combinations are complex while others are relatively simple, and thus two, three, or even more selections can be made, simultaneously, in series, or a combination of both. A person may press a shift key on a keyboard simultaneously (e.g., hold both down even if one is pressed prior to the other) with a space bar, then release the shift key, maintaining a press on the space bar, while touching a keypad. Simpler examples are also permitted, such as pressing a volume-up button and a power button simultaneously on a smartphone.

As noted above, the combination of physical selections can be at least partially through an NFC wireless transmission. Examples include those where the physical structures include a key or button of a keyboard when the keyboard is associated with, but not integral with, the computing device. The keyboard can include a wireless NFC transmitter through which the NFC wireless transmission is transmitted.

At 304, based on the combination of physical selections, a person is determined to be in possession of a secure physical entity. As noted, this secure physical entity is integral with the computing device. Because of this, a person cannot lose or damage the secure physical entity without also damaging the computing device. The user is also not inconvenienced by having to maintain possession of the secure physical entity or some other second factor authentication object in order to have a something you have.

Determining possession can be performed by the secure physical entity 104 by comparing the combination of physical selections with a unique combination associated with the person. The comparison can be performed in hardware or firmware of the secure physical entity 104 by comparing a stored combination with the combination received through the wires 106 and the wired input ports 216, or in whole or in part with an NFC transmission as noted above. Ways in which a binary yes/no in comparing two sets of data are well known in the art, and can be performed securely within a physical integrated circuit or in software. Here the combination needed to show possession can be stored permanently, and without ongoing power usage, as the unique combination 220. As noted, there can be more than one unique combination 220, with each representing a different person or a different set of access rights. In the case of different sets of access rights, there are multiple secure keys 212, each representing those different access rights.

At 306, a credential is received and authenticated. This credential is the something you know, such as a password, received by the computing device. The computing device may rely on the firmware 214 of the secure physical entity 104, or may receive and authenticate the person's password through the authenticator 210. This operation can be optional, assumed to be completed prior to determining possession at operation 304, or be performed after determining possession, in which case the method permits access after receiving an indication that the credential is authentic. Note that receiving the credential can also be optional for enabling use of the resources of the computing device. Further, the credential received and authenticated can be the same combination of physical selections, which is described in greater detail below.

At 308, responsive to the determination of the possession of the secure physical entity, use of a resource of the computing device is enabled. In some cases, the secure physical entity 104 determines possession and passes this indication to the authenticator 210, which in turn allows access if a person's credential is later (or has already been) authenticated. In such a case, the secure physical entity 104 passes an appropriate security key 212, such as one associated with the combination of physical selections, and therefore the person and the rights, if there are more than one set of or level of rights. With this secure key 212, the authenticator 210 enables the use of the resource, though the authenticator 210 may also require authentication of the credential.

In other cases, the secure physical entity 104 permits or causes another to allow access to resources without any indication of a credential being authenticated. The techniques may consider the combination of physical selections to represent both the something you have with the something you know. This can be done with lower-priority resources and information or even for higher-priority resources. For higher-priority resources the combination is unlikely to be highly simple, such as pressing a power and volume button simultaneously. Instead, the combination can be sufficient complex to represent both the have and the know. In some cases, the secure physical entity 104 enables use of the resource without aid from another entity based on this complexity. In some other cases, the secure physical entity 104 may determine that the person is in possession based on a combination and also pass the combination to another entity, which then treats the combination as a credential, such as to the authenticator 210. Thus, one entry of a combination of physical selections can both prove that the person is in possession of the secure physical entity (the something you have) and prove the something you know. While not required for the techniques, this is one possible and highly efficient manner in which to authenticate and enable resource usage for a person.

Consider, for example, a person wishing to use her computer. She turns it on, and then presses a three-key combination matching the combination for the secure physical entity 104. She is then determined to be in possession. She has not yet entered a password, so she may be able to open her computer with limited rights, such as to browse the internet. Or those limited rights may be enough to use the computer just to have a user interface ask for a password. Or there may be different levels of access based on which password she enters, so the initial access is a lowest level, say only local data, and then two different passwords allow a medium (e.g., server data) and a high level of access (e.g., enterprise-wide administrator access), respectively.

Consider, for a second example, a man wishing to use his laptop and all his normal rights, such as internet access, server data access, and local data access. Assume that he turns on his laptop, and then selects a combination that presses buttons and touches some of which are simultaneous and some of which are in series, and that, based on the timing and complexity, are difficult for another person watching him to be able to replicate. Through this, the techniques may give him full access without a separate credential. Thus, the person is indicated to be in possession or the resource is enabled without passing this indication to another entity to enable access (e.g., the authenticator 210).

The method 300 may be used for more than one person, as the secure physical entity 104 may store more than one unique combination 220. Thus, optionally, at 310, a different combination of physical selections made through two or more different physical structures is received. At 312, the different combination is compared to the unique combinations 220 and determined not to match, in which case access to the resource of the computing device 102 is denied at operation 316. At 314, the different combination is compared to the unique combinations 220 and determined to match one of the unique combinations 220, in which case access to the resource of the computing device 102 is enabled at operation 308. By so doing, more than one person can use a computing device, though the resources permitted access on that computing device may vary based on the identity of the person.

Figure 4:
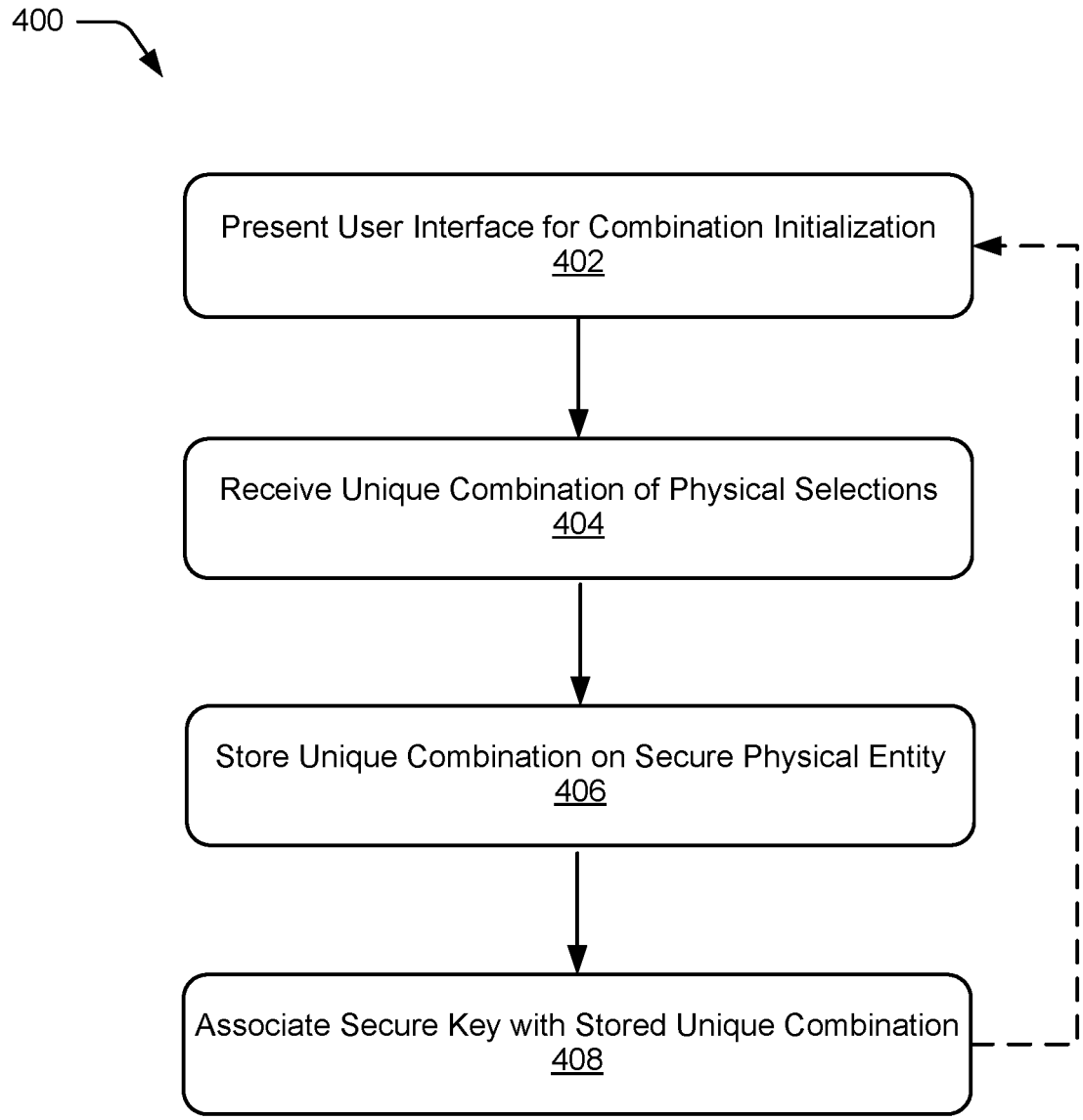
FIG. 4 illustrates example methods for initializing a person to the secure physical entity.

While not required, the techniques may initialize a person to the secure physical entity, as shown by example method 400 of FIG. 4. This initialization can simply be to tell the person what the unique combination of physical selections are needed to verify possession of the secure physical entity. In some cases, however, multiple people, multiple access rights, and user-selectable combinations of physical selections are permitted.

At 402, a user interface is presented indicating that selection of a combination of physical selections can be initialized. The user interface can present various options, such as the physical structures 108 of FIG. 1 that are wired to the secure physical entity 104, and can be performed remotely or on a computing device having a secure physical entity. Note that not all potential physical structures may be wired, rather some subset may be wired and some wireless. Thus, assume here than the user interface asks the person to select three of the following physical structures 108 to be simultaneously selected: touch keyboard's touch pad; press any single or two buttons on keyboard; press volume-down button on display; press volume-up button on display; press power button on display; press power button on main computer chassis; rotate peripheral volume selector up or down (e.g. one wired or wireless); tilt display relative to keyboard (for connected display/keyboards).

At 404, a unique combination of physical selections of the physical structures is received. This combination can be received by the secure physical entity 104 and then the combination saved as one of the unique combinations 220. Here various levels of complexity can be used or forgone, such as associating the unique combination 220 with a particular person, though this is not required. Thus, any person knowing the physical selections may be permitted to be determined as in possession of the computing device 102, in that particular case. In other cases, multiple different combinations can be received and associated with different persons or different resources for a same person.

At 406, the unique combination of physical selections is stored as a unique combination on the secure physical entity. This is but one example of the unique combinations 220 shown in FIG. 2, and used in method 300.

Figure 5:
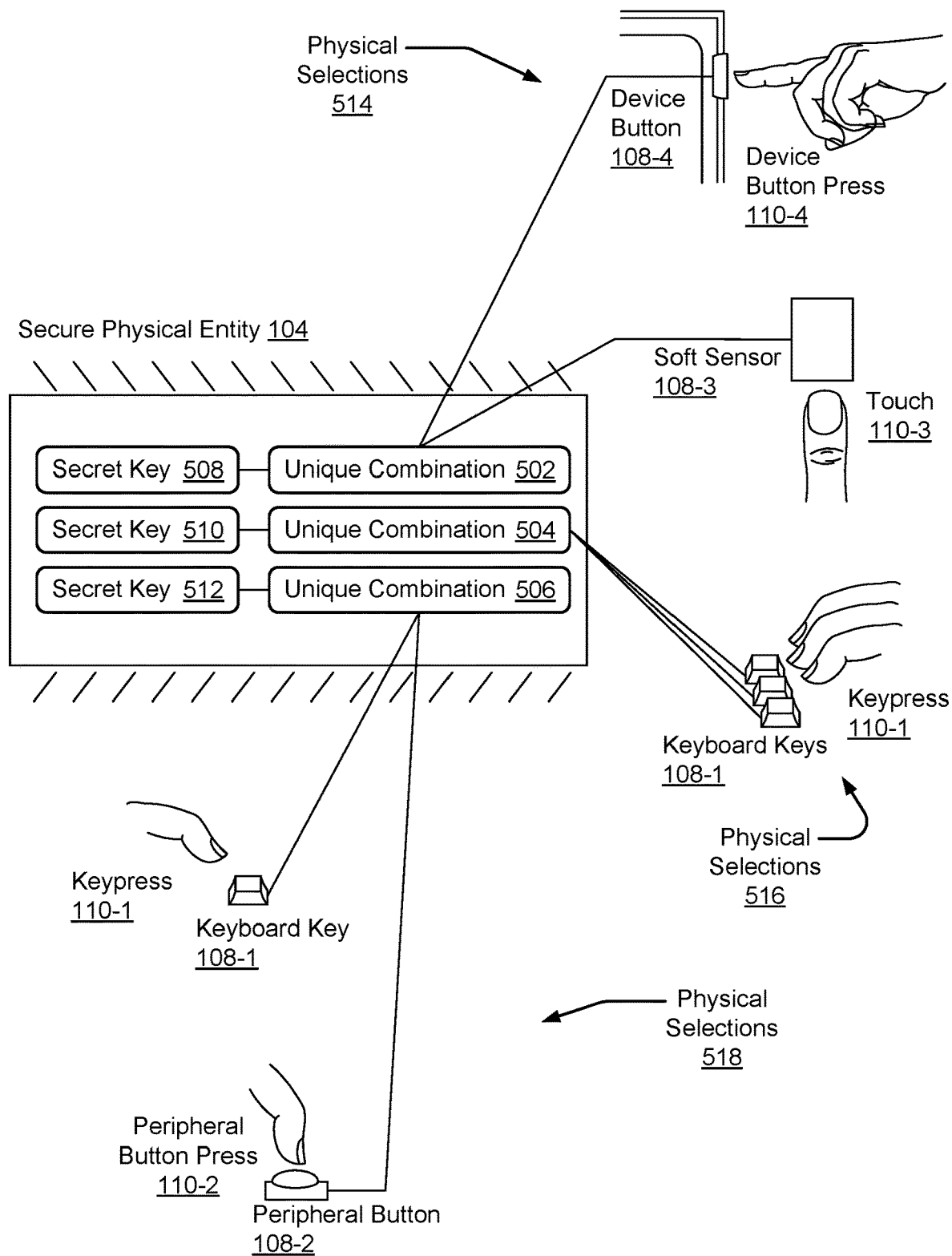
FIG. 5 illustrates three different unique combinations of physical selections, each for a different person or resource.

At 408, the stored, unique combination is associated with a secure key, such as one of secure keys 212 or one of those shown in FIG. 5. As noted, each secure key can be associated with a different person and/or different resource rights. Method 400 can be repeated, shown with a dashed line.

Assume, by way of example, that two people have initialized the secure physical entity, each with different combinations, and that one of them has initialized with two levels of resource access. This is illustrated in FIG. 5, which shows three different unique combinations, a first person's unique combination 502, a second person, low-level access's unique combination 504, and a second person, high-level access's unique combination 506. Note that each of these combinations have a corresponding secret key 508, 510, and 512, and that each requires different physical selections 514, 516, and 518, respectively. Examples physical selections and physical structures from FIG. 1 are provided for illustration. The physical selections 514 include the device button press 108-4 and the touch 110-3. The physical selections 516 include three simultaneous key-presses 110-1. The physical selections 518 include the keypress 110-1 and the peripheral button press 110-2.

On selection of any of these three combinations of physical selections, possession and identity are confirmed, as well as resource rights (for second and third combinations as noted above). Each associated secret key 508, 510, or 512 is then passed to the firmware 214 and/or the authenticator 210, as described above.

The preceding discussion describes methods relating to second factor authentication. Aspects of these methods may be implemented in hardware (e.g., fixed logic circuitry), firmware, software, manual processing, or any combination thereof. These techniques may be embodied on one or more of the entities shown in FIGS. 1, 2, 5, and 6 (computing system 600 is described in FIG. 6 below), which may be further divided, combined, and so on. Thus, these figures illustrate some of the many possible systems or apparatuses capable of employing the described techniques. The entities of these figures generally represent software, firmware, hardware, whole devices or networks, or a combination thereof.

Example Computing System

Figure 6:
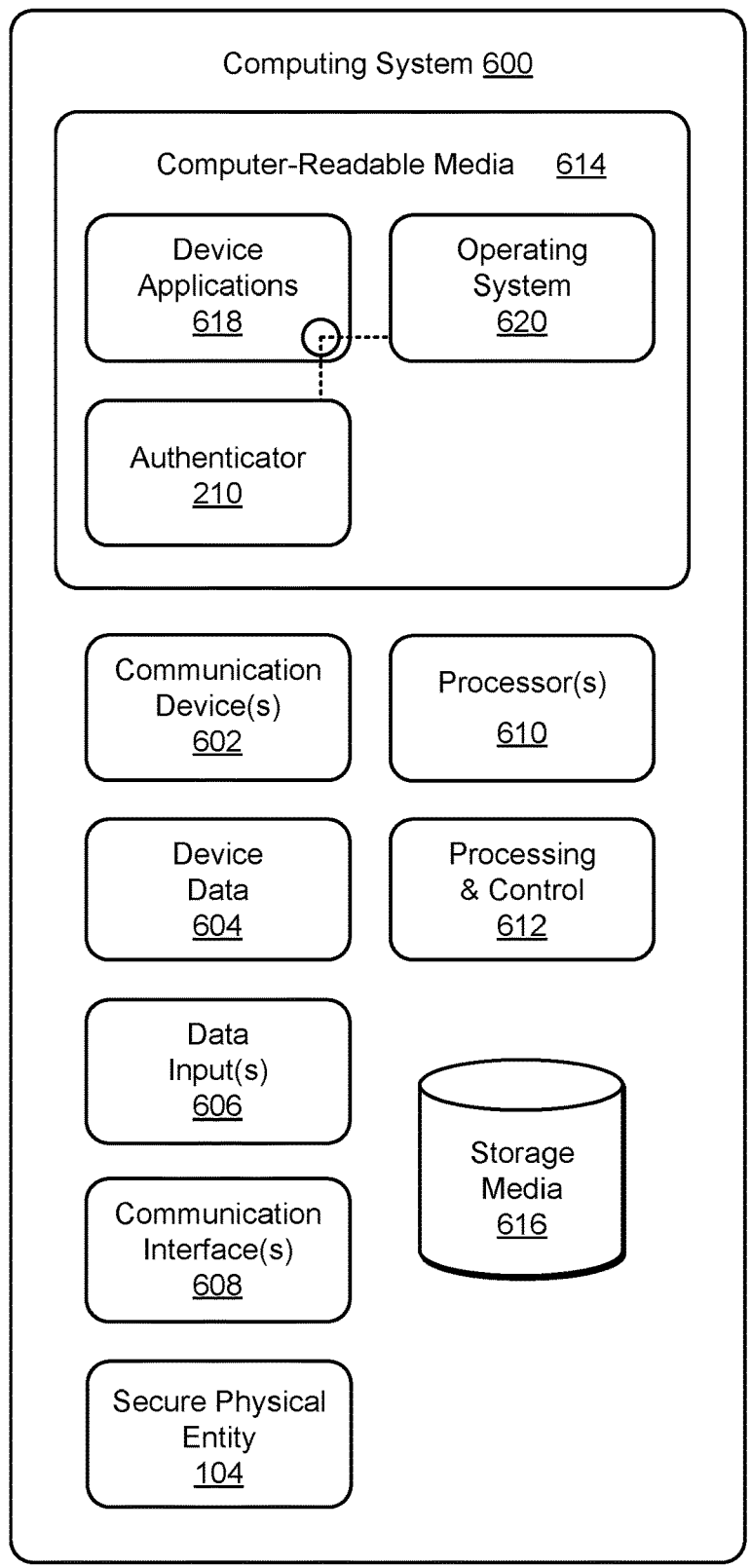
FIG. 6 illustrates various components of an example computing system that can implement integrated second factor authentication in accordance with one or more aspects.

FIG. 6 illustrates various components of example computing system 600 that can be implemented as any type of client, server, and/or computing device as described with reference to the previous FIGS. 1-5 to perform integrated second factor authentication. In aspects, the computing system 600 can be implemented as one or a combination of a wired and/or wireless wearable device, System-on-Chip (SoC), and/or as another type of device or portion thereof. The computing system 600 may also be associated with a user (e.g., a person wishing to gain access to information and resources) and/or an entity that operates the device such that a device describes logical devices that include software, firmware, and/or a combination of devices.

The computing system 600 includes the secure physical entity 104 of FIGS. 1, 2, and 5, though this entity need not be exactly as illustrated. The secure physical entity 104 can be integral with the computing system 600 through integration with a mother board, or separate from, but within the computing systems 600 frame, chassis, or other structure.

The computing system 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on the computing system 600 can include any type of audio, video, and/or image data, and can be a resource or information to which access is desired. The computing system 600 includes one or more data inputs 606 via which any type of data, media content, and/or inputs can be received, such as human utterances, user-selectable inputs (explicit or implicit), physical, selectable structures, messages, music, television media content, recorded video content, and any other type of audio, video, and/or image data received from any content and/or data source.

The computing system 600 also includes communication interfaces 608, which can be implemented as any one or more of a serial and/or parallel interface, a wireless interface, any type of network interface, a modem, and as any other type of communication interface, such as NFC wireless interfaces. The communication interfaces 608 provide a connection and/or communication links between the computing system 600 and a communication network by which other electronic, computing, and communication devices communicate data with the computing system 600.

The computing system 600 includes one or more processors 610 (e.g., any of microprocessors, controllers, and the like), which process various computer-executable instructions to control the operation of the computing system 600 and to enable techniques for, or in which can be embodied, integrated second factor authentication. Alternatively or in addition the computing system 600 can be implemented with any one or combination of hardware, firmware, or fixed logic circuitry that is implemented in connection with processing and control circuits, which are generally identified at 612. Although not shown, the computing system 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 600 also includes computer-readable media 614, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 600 can also include a mass storage media device 616.

The computer-readable media 614 provides data storage mechanisms to store the device data 604, as well as various device applications 618 and any other types of information and/or data related to operational aspects of the computing system 600. For example, an operating system 620 can be maintained as a computer application with the computer-readable media 614 and executed on the processors 610. The device applications 618 may include a device manager, such as any form of a control application, software application, signal-processing and control module, code that is native to a particular device, a hardware abstraction layer for a particular device, and so on.

The device applications 618 also include any system components, engines, or managers to implement the techniques. In this example, the device applications 618 include the authenticator 210.

Although aspects of integrated second factor authentication have been described in language specific to features and/or methods, the subject of the appended claims is not necessarily limited to the specific features or methods described. Rather, the specific features and methods are disclosed as example implementations of integrated second factor authentication.

What is claimed is:

1. A method comprising:
   storing, by a security chip that is integrated with a computing device, multiple unique combinations of inputs that are each associated with one of multiple different authorized users of the computing device in the security chip, wherein the security chip comprises a silicon chip integral with an integrated circuit, motherboard, central processing unit (CPU), or other hardware of the computing device;
   receiving, by the security chip that is integrated with the computing device, a first input that indicates of a selection of a first physical structure that is integrated with the computing device or that is provided as a peripheral of the computing device;
   receiving, by the security chip that is integrated with the computing device, a second input that indicates a proximity of a particular authorized user to a second physical structure that is integrated with the computing device or that is provided as a peripheral of the computing device; and
   determining, by the security chip that is integrated with the computing device, and based in part on a combination of the first input and the second input matching a particular combination of inputs that is associated with the particular authorized user, that the particular authorized user is in the proximity to the security chip and the computing device; and
   in response to determining the combination of the first input and the second input matches a particular combination of inputs associated with the particular authorized user and stored in the security chip, granting, by the security chip, access to a resource of the computing device by the particular authorized user,
   wherein the security chip authenticates the particular authorized user by using the first input, the second input, and the multiple unique combinations of inputs stored in the security chip; and
   storing each of the multiple unique combination in association with a corresponding cryptographically secure key, wherein each unique combination comprises a plurality of inputs and a particular manner of entering the plurality of inputs; and
   allowing an authenticating device to authenticate the particular authorized user using the corresponding cryptographically secure key prior to granting, by the security chip, access to the resource of the computing device by the particular authorized user.

2. The method of claim 1, wherein the combination of the first input and the second input is received simultaneously by the security chip.

3. The method of claim 1, wherein the selection of the first physical structure includes a contact with a touch sensor.

4. The method of claim 1, wherein the indication of a proximity to the second physical structure includes detecting motion by a proximity sensor.

5. A system comprising:
   one or more computers; and
   one or more storage devices storing instructions that, when executed by the one or more computers, cause the one or more computers to perform operations comprising:
   storing, by a security chip that is integrated with a computing device, multiple unique combinations of inputs that are each associated with one of multiple different authorized users of the computing device in the security chip, wherein the security chip comprises a silicon chip integral with an integrated circuit, motherboard, central processing unit (CPU), or other hardware of the computing device;
   receiving, by the security chip that is integrated with the computing device, a first input that indicates of a selection of a first physical structure that is integrated with the computing device or that is provided as a peripheral of the computing device;
   receiving, by the security chip that is integrated with the computing device, a second input that indicates a proximity of a particular authorized user to a second physical structure that is integrated with the computing device or that is provided as a peripheral of the computing device; and
   determining, by the security chip that is integrated with the computing device, and based in part on a combination of the first input and the second input matching a particular combination of inputs that is associated with the particular authorized user, that the particular authorized user is in the proximity to the security chip and the computing device; and
   in response to determining the combination of the first input and the second input matches a particular combination of inputs associated with the particular authorized user and stored in the security chip, granting, by the security chip, access to a resource of the computing device by the particular authorized user,
   wherein the security chip authenticates the particular authorized user by using the first input, the second input, and the multiple unique combinations of inputs stored in the security chip; and
   storing each of the multiple unique combination in association with a corresponding cryptographically secure key, wherein each unique combination comprises a plurality of inputs and a particular manner of entering the plurality of inputs; and
   allowing an authenticating device to authenticate the particular authorized user using the corresponding cryptographically secure key prior to granting, by the security chip, access to the resource of the computing device by the particular authorized user.

6. The system of claim 5, wherein the combination of the first input and the second input is received simultaneously by the security chip.

7. The system of claim 5, wherein the selection of the first physical structure includes a contact with a touch sensor.

8. The system of claim 5, wherein the indication of a proximity to the second physical structure includes detecting motion by a proximity sensor.

9. The system of claim 5, wherein the operations comprise:
   determining, by the security chip, whether the combination of inputs match one of multiple unique input combinations stored in the security chip.

10. The system of claim 9, wherein the operations comprise:
    responsive to the combination of inputs not matching one of the multiple unique input combinations, denying access to the resource of the computing device.

11. A non-transitory computer-readable storage device encoded with computer program instructions that, when executed by one or more computers, cause the one or more computers to perform operations comprising:
    storing, by a security chip that is integrated with a computing device, multiple unique combinations of inputs that are each associated with one of multiple different authorized users of the computing device in the security chip, wherein the security chip comprises a silicon chip integral with an integrated circuit, motherboard, central processing unit (CPU), or other hardware of the computing device;
    receiving, by the security chip that is integrated with the computing device, a first input that indicates of a selection of a first physical structure that is integrated with the computing device or that is provided as a peripheral of the computing device;
    receiving, by the security chip that is integrated with the computing device, a second input that indicates a proximity of a particular authorized user to a second physical structure that is integrated with the computing device or that is provided as a peripheral of the computing device; and
    determining, by the security chip that is integrated with the computing device, and based in part on a combination of the first input and the second input matching a particular combination of inputs that is associated with the particular authorized user, that the particular authorized user is in the proximity to the security chip and the computing device; and
    in response to determining the combination of the first input and the second input matches a particular combination of inputs associated with the particular authorized user and stored in the security chip, granting, by the security chip, access to a resource of the computing device by the particular authorized user,
    wherein the security chip authenticates the particular authorized user by using the first input, the second input, and the multiple unique combinations of inputs stored in the security chip; and
    storing each of the multiple unique combination in association with a corresponding cryptographically secure key, wherein each unique combination comprises a plurality of inputs and a particular manner of entering the plurality of inputs; and
    allowing an authenticating device to authenticate the particular authorized user using the corresponding cryptographically secure key prior to granting, by the security chip, access to the resource of the computing device by the particular authorized user.

12. The device of claim 9, wherein the combination of the first input and the second input is received simultaneously by the security chip.

13. The device of claim 9, wherein the selection of the first physical structure includes a contact with a touch sensor.

14. The device of claim 9, wherein the indication of a proximity to the second physical structure includes detecting motion by a proximity sensor.

* * * * *

UNITED STATES PATENT AND TRADEMARK OFFICE
CERTIFICATE OF CORRECTION

| | |
|---|---|
| PATENT NO. | : 11,394,704 B2 |
| APPLICATION NO. | : 16/412686 |
| DATED | : July 19, 2022 |
| INVENTOR(S) | : Brand et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 221 days.

Signed and Sealed this
Twenty-ninth Day of August, 2023

Katherine Kelly Vidal
*Director of the United States Patent and Trademark Office*